United States Patent
Hu et al.

(10) Patent No.: US 9,203,109 B2
(45) Date of Patent: Dec. 1, 2015

(54) RECHARGEABLE LITHIUM BATTERY FOR WIDE TEMPERATURE OPERATION

(71) Applicant: Massachusetts Institute of Technology, Cambridge, MA (US)

(72) Inventors: Qichao Hu, Somerville, MA (US); Antonio Caputo, Woodbridge (CA); Donald R. Sadoway, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 13/789,579

(22) Filed: Mar. 7, 2013

(65) Prior Publication Data

US 2013/0236764 A1    Sep. 12, 2013

Related U.S. Application Data

(60) Provisional application No. 61/607,804, filed on Mar. 7, 2012.

(51) Int. Cl.
*H01M 10/00* (2006.01)
*H01M 10/056* (2010.01)
*H01M 10/052* (2010.01)
H01M 10/0565 (2010.01)
H01M 10/0566 (2010.01)

(52) U.S. Cl.
CPC .......... *H01M 10/056* (2013.01); *H01M 10/052* (2013.01); *H01M 10/0565* (2013.01); *H01M 10/0566* (2013.01); *H01M 2300/0045* (2013.01); *H01M 2300/0085* (2013.01); *H01M 2300/0094* (2013.01); *Y02E 60/122* (2013.01); *Y02T 10/7011* (2013.01)

(58) Field of Classification Search
CPC . Y02E 60/122; Y02E 60/124; H01M 5/1002; H01M 10/0265; H01M 8/0221; H01M 8/1018; H01M 8/241; H01M 10/052; H01M 10/0525; H01M 2300/0082; H01M 10/0566
USPC ......................................... 429/127, 188, 199
See application file for complete search history.

(56) References Cited

U.S. PATENT DOCUMENTS

| | | | |
|---|---|---|---|
| 6,194,099 B1 * | 2/2001 | Gernov et al. | 429/213 |
| 2004/0122178 A1 * | 6/2004 | Huang et al. | 525/221 |
| 2008/0057386 A1 | 3/2008 | Visco et al. | |
| 2010/0170735 A1 * | 7/2010 | Nakamura et al. | 180/68.5 |

OTHER PUBLICATIONS

Hu et al., Graft Copolymer-based Lithium-ion Battery for High Temperature Operation, Journal of Power Sources, vol. 196, No. 13, Jul. 1, 2011.
International Search Report, PCT/US2013/029720, Oct. 28, 2013, 5 pages.
Trapa et al., Rubbert Graft Copylymer Electrolytes ro Solid-State, Thin-Film Lithium Batteries, Journal of the Electrochemical Society, vol. 152, No. 1, Jan. 1, 2005.
Written Opinion, PCT/US2013/029720, Oct. 28, 2013, 7 pages.

* cited by examiner

*Primary Examiner* — Cynthia H Kelly
*Assistant Examiner* — Monique Wills
(74) *Attorney, Agent, or Firm* — Sunstein Kann Murphy & Timbers LLP

(57) ABSTRACT

Presented herein is a rechargeable lithium battery that includes a cathode, a liquid electrolyte, a solid electrolyte, and an anode. The anode is at least partially coated or plated with the solid electrolyte. The cathode may be porous and infiltrated by the liquid electrolyte. The cathode may also include a binder having a solid graft copolymer electrolyte (GCE). In certain embodiments, the liquid electrolyte is a gel that includes a PIL and a GCE. The battery achieves a high energy density and operates safely over a wide range of temperatures.

24 Claims, 14 Drawing Sheets

RECHARGEABLE LITHIUM BATTERY FOR WIDE TEMPERATURE OPERATION

CROSS-REFERENCE TO RELATED APPLICATION

This application claims priority to and the benefit of, and incorporates herein by reference in its entirety, U.S. Provisional Patent Application No. 61/607,804, filed Mar. 7, 2012.

TECHNICAL FIELD

This invention relates generally to rechargeable batteries and methods of manufacture. More particularly, in certain embodiments, this invention relates to a lithium battery that has a high energy density and operates safely over a wide range of temperatures.

BACKGROUND

Use of rechargeable batteries has increased substantially in recent years as global demand for technological products such as laptop computers, cellular phones, and other consumer electronic products has escalated. Current efforts to develop green technologies, such as electrical grid load-leveling devices and electrically powered vehicles, has further fueled the demand for rechargeable batteries having high energy densities.

One popular type of rechargeable battery is the lithium ion battery. Compared to other types of rechargeable batteries, lithium ion batteries provide high energy densities, lose a minimal amount of charge when not in use, and do not exhibit memory effects. Due to these beneficial properties, lithium ion batteries have found use in transportation, back-up storage, defense, and aerospace applications.

Traditional lithium ion rechargeable batteries have employed liquid electrolytes, such as a lithium-salt electrolyte (e.g., $LiPF_6$, $LiBF_4$, or $LiClO_4$) mixed with an organic solvent (e.g., alkyl carbonate). As the battery is discharged to produce electrons, the electrolyte provides a medium for ion flow between the electrodes, and the electrons flow between the electrodes through an external circuit.

Unfortunately, existing rechargeable batteries (e.g., lithium ion batteries) are incapable of operating safely over a wide range of temperatures of interest. The energy density of existing rechargeable batteries is also inadequate for many applications.

There is a need for rechargeable batteries that provide high energy densities and operate safely over a wide range of temperatures, when compared to existing rechargeable batteries, such as lithium ion batteries.

SUMMARY OF THE INVENTION

Presented herein is a rechargeable lithium ion battery that allows a wide temperature range of operation and provides high energy density. In certain embodiments, the battery includes a cathode, a liquid electrolyte, a solid electrolyte, and an anode. The anode is at least partially coated or (at least partially) plated with the solid electrolyte. The cathode may be porous and infiltrated by the liquid electrolyte.

According to various embodiments, the battery has a two-layer electrolyte design that involves two mutually immiscible layers—a solid layer and a liquid layer. The layers of the battery are configured such that lithium ions traveling from one electrode to the other need to pass through two different electrolytes in series.

In certain embodiments, the battery includes a solid copolymer coating on a lithium metal anode. The solid copolymer coating advantageously prevents dendrite formation on the anode, thereby improving cycle life. The solid copolymer coating also isolates the anode from the ionic liquid, thereby providing safe operation at high temperatures. Certain embodiments of the battery further include an electrolyte comprising a polymer ionic liquid (PIL) that provides improved battery performance at low temperatures. Use of a battery with a solid copolymer-coated lithium metal anode and a PIL-containing electrolyte gel provides synergistic benefits, for example, energy densities that are two to three times higher than those achieved with a battery with similarly sized lithium ion anode, as well as safe operation over a wide range of temperatures. Furthermore, in certain embodiments, the nature of the layers of the battery allows simpler manufacture, e.g., the entire battery may be roll-to-roll printed.

In certain embodiments, the cathode may also include a binder having a solid graft copolymer electrolyte (GCE). In certain embodiments, the liquid electrolyte is a gel that includes a polymer ionic liquid (PIL) and a GCE.

In one aspect, the invention relates to a rechargeable lithium battery. The battery includes a cathode, a liquid electrolyte, and an anode. The anode is at least partially coated or plated with a solid electrolyte. In certain embodiments, the cathode and the anode are positioned in relation to each other such that a lithium ions travelling from one electrode to the other pass through the liquid electrolyte and the solid electrolyte in series.

In certain embodiments, the liquid electrolyte comprises at least one member selected from the group consisting of an ionic liquid, an organic carbonate liquid, a liquid polymer, and a gel electrolyte. the solid electrolyte comprises at least one member selected from the group consisting of a solid polymer, a ceramic, and a polymer-ceramic composite.

In certain embodiments, the solid electrolyte comprises a solid copolymer. In certain embodiments, the solid copolymer is a solid graft copolymer electrolyte (GCE) comprising at least two low glass transition temperature ($T_g$) polymer blocks {e.g., a hydrophobic block such as polydimethyl siloxane (PDMS) and a hydrophilic block such as polyoxyethylene methacrylate (POEM) or polyoxyethylene acrylate (POEA); e.g., the $T_g$ is less than about 0° C., less than about −25° C., or less than about −40° C.}.

In certain embodiments, the solid electrolyte further comprises a lithium salt, e.g., a lithium salt selected from the group consisting of LiTFSI, $LiPF_6$, $LiBF_4$, $LiClO_4$, $LiCF_3SO_3$, $LiN(CF_3SO_2)_2$, $LiSbF_6$, $LiAsF_6$, $LiN(CF_3CF_2SO_2)_2$, $(C_2H_5)_4NBF_4$, $(C_2H_5)_3CH_3NBF_4$, and LiI.

In certain embodiments, the cathode is porous and is infiltrated by the liquid electrolyte. In certain embodiments, the liquid electrolyte comprises an ionic liquid. The liquid electrolyte can include a polymer ionic liquid (PIL). For example, the PIL can include a low molecular weight polymer, a thermally stable ionic liquid, and a lithium salt. In certain embodiments, the low molecular weight polymer comprises an ethylene oxide chain {e.g., the low molecular weight polymer is a glyme; e.g., is a glyme selected from the group consisting of poly(ethylene glycol) dimethyl ether [polyglyme, PEGDME], tetra(ethylene glycol) dimethyl ether [tetraglyme, TEGDME], tri(ethylene glycol) dimethyl ether [triglyme]; and/or e.g., the low molecular weight polymer has weight-average molecular weight of about 75 to about 2000, e.g., about 250 to about 500}. In certain embodiments, the thermally stable ionic liquid comprises an organic cation {e.g., an ammonium, imidazolium, piperidium, pyridinium, pyrrolidinium, phosphonium, and/or sulfonium-based cation} and an inorganic anion {e.g., a bis(trifluoromethylsulfonyl)imide, bromide, chloride, dicyanamide, hexafluorophosphate, phosphate, sulfate, iodide, sulfonate, nitrate, tetrafluoroborate, thiocyanate, and/or triflate-based anion}. In certain embodiments, the liquid electrolyte comprises at least one member selected from the group consisting of $LiPF_6$, $LiBF_4$, $LiClO_4$, $LiCF_3SO_3$, $LiN(CF_3SO_2)_2$, $LiSbF_6$, $LiAsF_6$, $LiN(CF_3CF_2SO_2)_2$, $(C_2H_5)_4NBF_4$, $(C_2H_5)_3CH_3NBF_4$, and $LiI$.

In certain embodiments, the anode comprises lithium, sodium, calcium, magnesium, aluminum, lithium alloy, sodium alloy, calcium alloy, magnesium alloy, aluminum alloy, and/or a lithium- (or other metal-) intercalant (e.g., graphite or silicon). In certain embodiments, the anode is at least partially coated or plated with a solid graft copolymer electrolyte (GCE), e.g., wherein the GCE comprises at least two low glass transition temperature ($T_g$) polymer blocks {e.g., a hydrophobic block such as polydimethyl siloxane (PDMS) and a hydrophilic block such as polyoxyethylene methacrylate (POEM) or polyoxyethylene acrylate (POEA); e.g., the $T_g$ is less than about 0° C., less than about −25° C., or less than about −40° C.}.

In certain embodiments, the cathode comprises $LiFePO_4$, $LiCoO_2$, $Li(Ni_xMn_yCo_z)O_2$ (NMC), VOx, an intercalant material, carbon particles, a solid block copolymer binder, and/or a thermally stable ionic liquid. The cathode can include a binder comprising a solid electrolyte. For example, the solid electrolyte can include a solid graft copolymer electrolyte (GCE), e.g., wherein the GCE comprises at least two low glass transition temperature ($T_g$) polymer blocks {e.g., a hydrophobic block such as polydimethyl siloxane (PDMS) and a hydrophilic block such as polyoxyethylene methacrylate (POEM) or polyoxyethylene acrylate (POEA); e.g., the $T_g$ is less than about 0° C., less than about −25° C., or less than about −40° C.}. In certain embodiments, the cathode comprises a thermally stable ionic liquid, wherein the thermally stable ionic liquid comprises an organic cation {e.g., an ammonium, imidazolium, piperidium, pyridinium, pyroolidinium, phosphonium, and/or sulfonium-based cation} and an inorganic anion {e.g., a bis(trifluoromethylsulfonyl)imide, bromide, chloride, dicyanamide, hexafluorophosphate, phosphate, sulfate, iodide, sulfonate, nitrate, tetrafluoroborate, thiocyanate, and/or triflate-based anion}.

In various embodiments, the battery further include a separator. The separator may be, for example, a polypropylene (PP), polyethylene (PE), or trilayer PP/PE/PP electrolytic separator membrane.

In certain embodiments, the anode has an average thickness in a range from about 50 nm to about 100 um (e.g., about 100 nm or about 1 um) (e.g., the anode is an ultra-thin lithium metal anode). In certain embodiments, the battery has a form selected from the group consisting of a pouch, a prism, a cylindrical, a thin film. In certain embodiments, the battery is flexible. In various embodiments, the battery is roll-to-roll printed.

Elements of embodiments described with respect to a given aspect of the invention may be used in various embodiments of another aspect of the invention. For example, it is contemplated that features of dependent claims depending from one independent claim can be used in apparatus and/or methods of any of the other independent claims.

BRIEF DESCRIPTION OF THE DRAWINGS

The objects and features of the invention can be better understood with reference to the drawings described below, and the claims.

DESCRIPTION

It is contemplated that articles, apparatus, methods, and processes of the claimed invention encompass variations and adaptations developed using information from the embodiments described herein. Adaptation and/or modification of the articles, apparatus, methods, and processes described herein may be performed by those of ordinary skill in the relevant art.

Throughout the description, where articles and apparatus are described as having, including, or comprising specific components, or where processes and methods are described as having, including, or comprising specific steps, it is contemplated that, additionally, there are articles and apparatus of the present invention that consist essentially of, or consist of, the recited components, and that there are processes and methods according to the present invention that consist essentially of, or consist of, the recited processing steps.

It should be understood that the order of steps or order for performing certain actions is immaterial so long as the invention remains operable. Moreover, two or more steps or actions may be conducted simultaneously.

The mention herein of any publication, for example, in the Background section, is not an admission that the publication serves as prior art with respect to any of the claims presented herein. The Background section is presented for purposes of clarity and is not meant as a description of prior art with respect to any claim.

In certain embodiments, a rechargeable lithium battery and methods of manufacturing the battery are provided. Compared to previous rechargeable batteries, the battery described herein has a higher energy density and is capable of safe operation from low temperatures (e.g., below 0° C.) to extremely high temperatures (e.g., above 200° C.). The battery may be portable and useful in a wide variety of applications, including downhole oil drilling, consumer electronics, and electric vehicle applications.

According to various embodiments of the present invention, a rechargeable lithium battery includes a cathode, a liquid electrolyte, and an anode, wherein the anode is at least partially coated or plated with a solid electrolyte.

Figure 5:
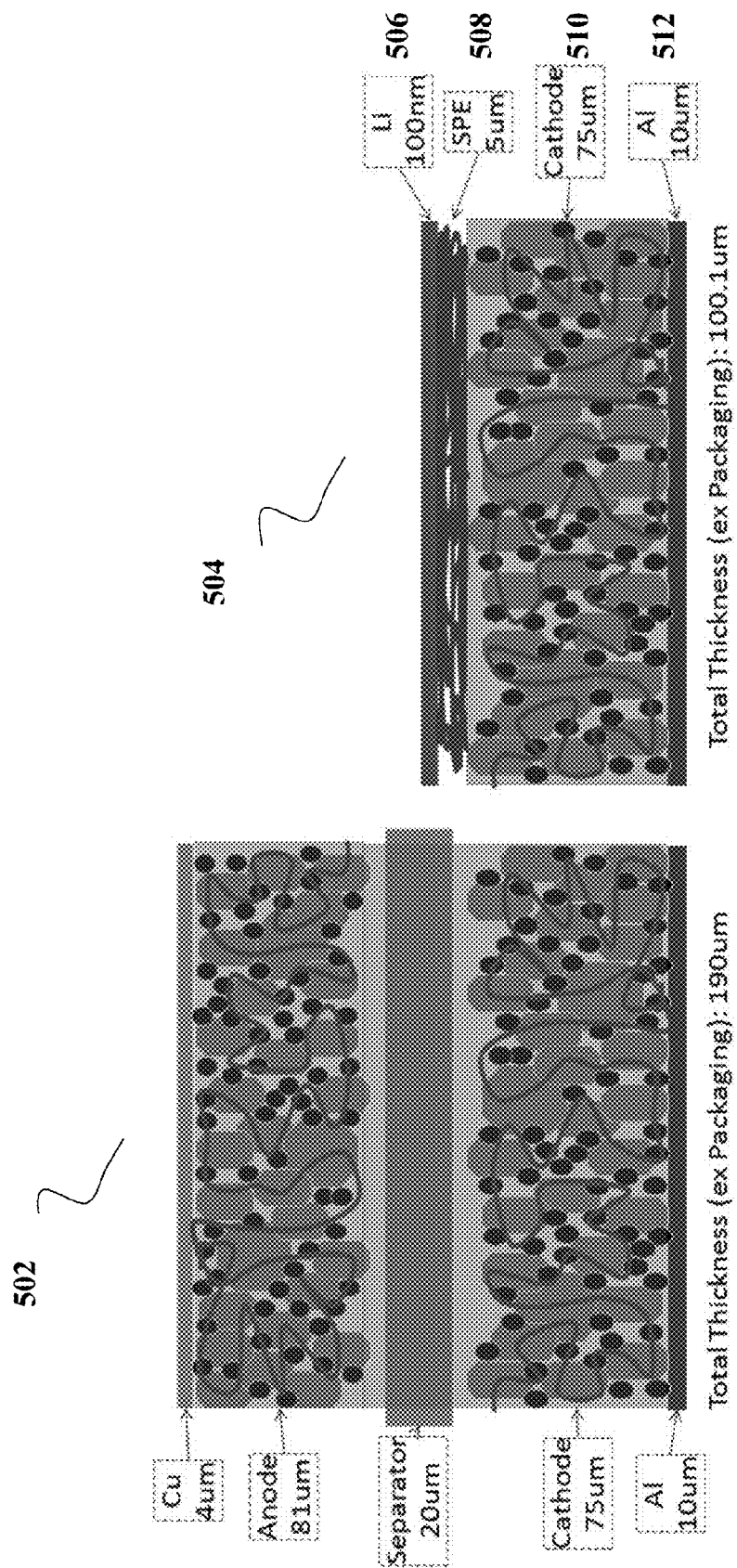
FIG. 5 is a schematic illustration of an conventional lithium battery as compared to a lithium battery in accordance with an illustrative embodiment of the invention.

FIG. 5 illustrates a comparison between a conventional Li-ion cell (502) and an exemplary cell (504) according to some embodiments of the invention. The lithium metal anode (506) can be made much thinner (e.g., about 100 nm) and lighter than conventional graphite or silicon anodes, thus allowing for much higher volumetric and gravimetric energy density. The anode (504) is protected by a passivation layer of a solid electrolyte (508) (e.g., solid polymer electrolyte (SPE) such as a graft (block) copolymer electrolyte (GCE)), which suppresses dendrite formation and prevents the decomposition of ionic liquid on lithium metal. The ionic liquid electrolyte infiltrates the porous cathode (510), thereby improving room temperature rate capability. In certain embodiments, an aluminum layer (512) is used in the cathode.

In some embodiments, the anode has an average thickness in a range from about 50 nm to about 100 μm, from about 100 nm to about 1 μm, or from about 200 nm to about 500 nm. In some embodiments, the anode has an average thickness less than about 100 μm, less than about 1 μm, less than about 500 nm, less than about 200 nm, less than about 100 nm or less than about 50 nm.

According to various embodiments, the battery has a two-layer electrolyte design that involves two mutually immiscible layers, a solid layer and a liquid layer. Without wishing to be bound by a particular theory, lithium ions traveling from one electrode to the other electrode need to pass through two different electrolytes in series.

In some embodiments, the batteries use lithiated cathodes and a protected ultra-thin lithium metal anode. On charge, lithium ions de-intercalate from cathode and move into liquid electrolyte, then into solid electrolyte, and finally are plated onto lithium metal anode. On discharge, lithium ions strip from lithium metal anode, move into solid electrolyte, then into liquid electrolyte, and finally are intercalated into cathode.

In certain embodiments, the solid electrolyte acts as a separator, thus no additional separator is needed. Alternatively, an additional separator may still be used when the solid electrolyte is very thin. The separator may be, for example, a polypropylene (PP), polyethylene (PE), or trilayer PP/PE/PP electrolytic separator membrane.

Figure 1:
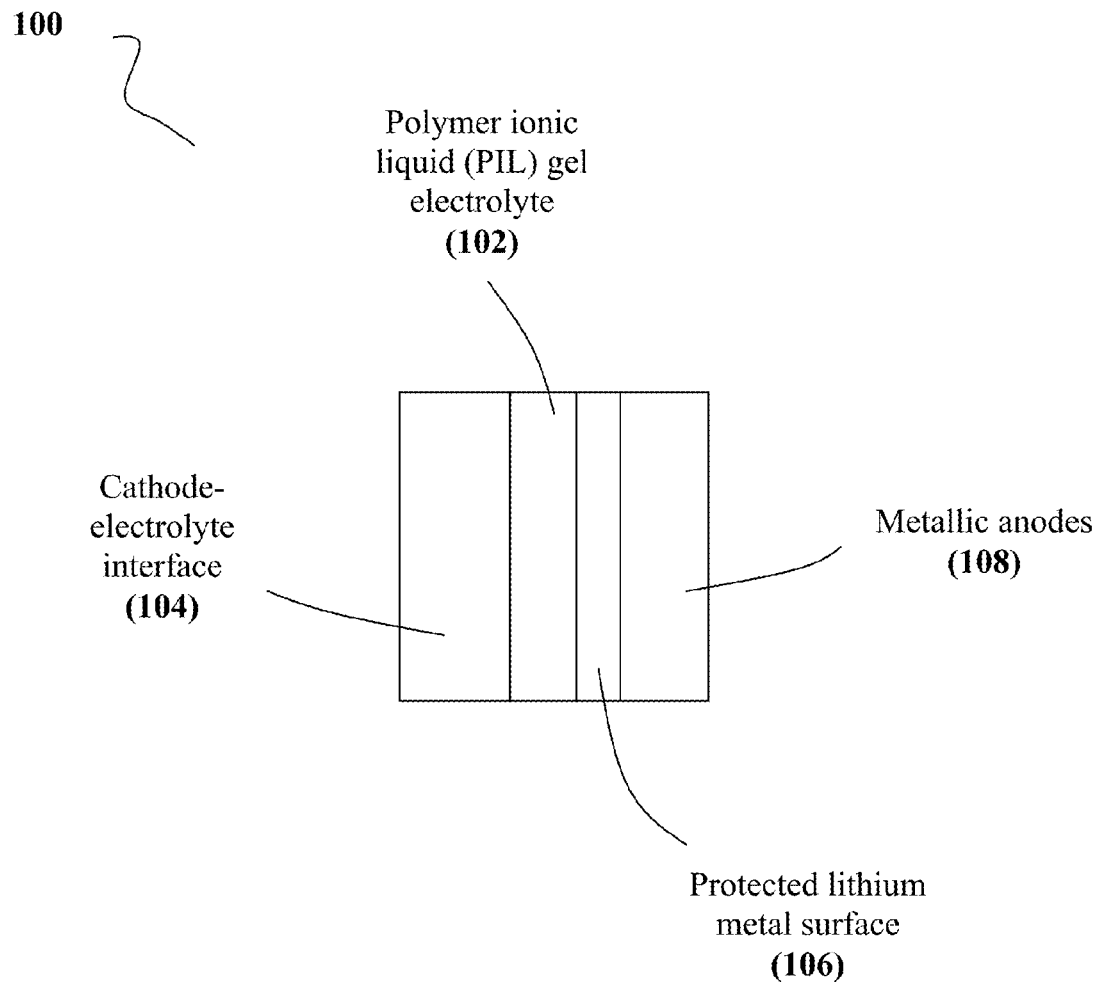
FIG. 1 is a schematic illustration of a lithium battery, in accordance with an illustrative embodiment of the invention.

FIG. 1 is a schematic illustration of a lithium battery (100), in accordance with certain embodiments of the invention. As depicted, the battery includes a polymer ionic liquid (PIL) gel electrolyte (102), a cathode-electrolyte interface (104), a protected lithium metal surface (106), and a metallic anode (108). In various embodiments, the gel electrolyte includes a polymer ionic liquid (PIL) and a solid graft (block) copolymer electrolyte (GCE). The PIL gel electrolyte has high conductivity (e.g., 10 to 20 mS/cm) but is generally a liquid, which may make handling or processing difficult. In one embodiment, the GCE is easily processed using printing techniques, but has low conductivity (e.g., about 0.01 mS/cm). The combination of PIL and GCE in the gel electrolyte creates a high conductivity and printable gel electrolyte.

In certain embodiments—for example, batteries having structure as shown in FIG. 5 (504) and FIG. 1 (100)—the battery has a liquid electrolyte such as a polymer ionic liquid (PIL). The PIL may include a low molecular weight polymer, a thermally stable ionic liquid, and a lithium salt. The low molecular weight polymer may include, for example, an ethylene oxide chain. In one embodiment, the low molecular weight polymer includes a glyme, such as poly(ethylene glycol) dimethyl ether [polyglyme, PEGDME], tetra(ethylene glycol)dimethyl ether [tetraglyme, TEGDME], and/or tri(ethylene glycol)dimethyl ether [triglyme]. A weight-average molecular weight of the low molecular weight polymer may be, for example, from about 75 to about 2000, or preferably from about 250 to about 500. In certain embodiments, the thermally stable ionic liquid includes ammonium, imidazolium, piperidium, pyridinium, pyrrolidinium, phosphonium, and/or sulfonium-based cations, and bis(trifluoromethylsulfonyl)imide, bromide, chloride, dicyanamide, hexafluorophosphate, phosphate, sulfate, iodide, sulfonate, nitrate, tetrafluoroborate, thiocyanate, and/or triflate-based anions. Examples of lithium salts include $LiPF_6$, $LiBF_4$, $LiClO_4$, $LiCF_3SO_3$, $LiN(CF_3SO_2)_2$, $LiSbF_6$, $LiAsF_6$, $LiN(CF_3CF_2SO_2)_2$, $(C_2H_5)_4NBF_4$, $(C_2H_5)_3CH_3NBF_4$, and/or LiI.

In some embodiments, the battery includes both a liquid electrolyte and a solid electrolyte. The solid electrolyte can be made with a solid polymer, ceramic, or polymer-ceramic composite. In various embodiments, the solid electrolyte includes a GCE. In certain embodiments, the solid GCE includes two low glass transition temperature polymer blocks and a lithium salt. In one embodiment, a first polymer block is hydrophobic, such as polydimethyl siloxane (PDMS), and a second polymer block is hydrophilic, such as polyoxyethylene methacrylate (POEM) and/or polyoxyethylene acrylate (POEA).

According to some embodiments, the battery includes a gel electrolyte. To form the gel electrolyte, in certain embodiments, PIL and GCE are combined at various weight ratios. For example, in one embodiment, the ratio of GCE to PIL (i.e., GCE:PIL) is from about 1:4 to about 1:1. The gel electrolyte can perform safely from subzero temperatures (e.g., near the melting point of the ionic liquid) to extremely high temperatures (e.g., above 200° C., or the melting point of pure lithium metal). The gel electrolyte may be used for rechargeable lithium batteries (e.g., lithium-ion, lithium-sulfur, and lithium-air) and/or primary lithium batteries.

Regarding the cathode-electrolyte interface, in certain embodiments, the cathode includes or consists of active materials, such as $LiFePO_4$, $LiCoO_2$, $Li(Ni_xMn_yCo_z)O_2$, and other intercalant materials, carbon particles, a solid block copolymer binder, and a thermally stable ionic liquid. In one embodiment, the solid GCE is used both as a binder in the cathode and as a component in the electrolyte. As described herein, the solid GCE may also be used as a coating on the anode.

In one embodiment, the thermally stable ionic liquid is used (e.g., infused into the cathode) to improve the cathode-electrolyte interfacial contact resistance. One technique of infusing the cathode with ionic liquid is to soak the cathode in a diluted mixture of ionic liquid with an organic solvent (e.g., tetrahydrofuran) and then evaporate the organic solvent. Another technique is to mix the solid block copolymer with ionic liquid, and use the gel electrolyte as the cathode binder.

Regarding the protected lithium metal surface, in certain embodiments, an anode is coated with a thin layer (e.g., greater than about 10 microns, or from about 20 microns to about 50 microns) of solid GCE. The GCE coating may protect the surface of the anode and prevent dendrite formation, thereby enhancing overall battery stability and cycle life. In one embodiment, the GCE coating isolates the anode (e.g., a lithium metal anode) from the ionic liquid, which may not be stable (e.g., at high temperatures).

In various embodiments, to increase the overall energy density of the battery (e.g., over existing lithium ion batteries), the anode includes or consists of a lithium metal and/or a lithium-alloy. In some embodiments, the anode includes or consists of a pure metal (e.g., lithium, sodium, calcium, magnesium, aluminum, and/or their alloys) and/or a lithium-intercalant (e.g., graphite and/or silicon).

Referring again to FIG. 1, the electrolyte, including the anode protective interface or coating, the gel electrolyte, and the cathode binder or electrolyte interface, is layered. In certain embodiments, the layered structure of the gel electrolyte allows the conductivity and/or mechanical properties of the battery to be tuned to optimize battery performance. In one embodiment, the entire battery (e.g., the anode, the cathode, and the electrolyte) is roll-to-roll printed, due its unique layered structure.

The batteries described herein are capable of safe operation over a wide range of temperatures (e.g., from subzero low temperatures to extremely high temperatures, such as above 200° C., or the melting point of pure lithium metal) and have many applications in a variety of products and industries. For example, due to the wide temperature range of operation, the battery may be used for downhole oil and gas exploration, consumer electronics, electric vehicles, thin films, flexible, and remote site energy storage. Specifically, the battery can operate safely in the subzero temperature at the surface of the drill rig, and in the extremely high temperatures downhole. Also, because the battery is rechargeable, the battery may be recharged using a generator near the drill tip (e.g., by harvesting the mud fluid motion). The battery also has applications in consumer electronics and in electrical vehicles, where the high energy density (e.g., more than twice the energy density of previous lithium-ion batteries) and lack of a cooling or heating system (i.e., a cooling or heating system may not be needed for this battery) may dramatically increase the overall energy density or driving range per charge. In some applications, the battery lasts more than twice as long as previous lithium-ion batteries, and the battery operates safely (e.g., does not explode or blow up) when heated.

The batteries described herein can be made into standard forms including pouches, prisms, and cylinders, and also non-standard forms including flexible structures and thin films.

EXPERIMENTAL EXAMPLES

Graft copolymers (i.e., POEM-g-PDMS and POEA-g-PDMS, at a 90:10 weight ratio) were synthesized from a POEM monomer, a POEA monomer, and a PDMS macromonomer, using a free radical polymerization technique. Both the POEM monomer (poly(ethylene glycol) methyl ether methacrylate) and the POEA monomer (poly(ethylene glycol) methyl ether acrylate) have 8 repeating EO units and a density of 1.09 g/mL, and are liquid at room temperature. Average molecular weights for the POEM monomer and the POEA monomer are $M_n$=475 g/mol and $M_n$=480 g/mol, respectively. The POEM monomer and the POEA monomer were purchased from Sigma Aldrich. The PDMS macromonomer (monomethacryloxypropyl-terminated polydimethylsiloxane asymmetric) has a molecular weight of $M_n$=10,000 g/mol (n=145) and was purchased from Gelest. An initiator, 2,2'-Azobis(2-methylpropionitrile) (AIBN), and salts, lithium bis(trifluoromethane)sulfonimide (LiTFSI), were purchased from Sigma Aldrich and have a purity of 98% and 99.95%, respectively. All solvents, including ethyl acetate (EA), petroleum ether (PE), and tetrahydrofuran (THF), were purchased from Sigma Aldrich. All chemicals were used as received.

To produce the graft copolymers, 26 mL of POEM (or POEA) monomers, 3.2 mL of PDMS macromonomers, and 12 mg of AIBN (monomer:initiator=825:1) were mixed in 160 mL of EA. A flask containing the solution was sealed with a rubber septum and purged with argon for 45 minutes. The solution was then heated to 72° C. (AIBN has a decomposition rate of $3.2 \times 10^{-5}$ $s^{-1}$) in an oil bath under constant stirring for 24 hours. In general, the initially clear solution became visibly milky within two hours. The final solution was precipitated in an immiscible solvent of PE. The polymer was dried at 80° C. under less than 5 milliTorr vacuum for 5 days to remove the residual moisture. It was found that if the polymer was not dried properly, excessive moisture would lead to crack formation, when the polymer was cast into thin films. The final graft copolymer had a molecular weight of 500,000 g/mol, as measured using gel permeation chromatography with a polystyrene calibration standard. The graft copolymer was complexed with LiTFSI at a Li:EO ratio of 1:20 (1 g of POEM-g-PDMS (90:10) with 216 mg of LiTFSI) in a common solvent of THF to form the electrolyte.

For cathode preparation, to ensure ion conduction throughout the cathode, the graft copolymer electrolyte (GCE) was also used as a binder material, replacing a non-ion-conducting polyvinylidene fluoride (PVDF). The cathode was synthesized by mixing ball-milled LiFePO$_4$ powders (Linyi Gelon New Battery Materials) and carbon black (Super P), and dissolving the mixture in GCE solution at a weight ratio of 5:1:1. The resulting slurry was then sonicated, magnetically stirred (to ensure proper mixing), and doctor-bladed at a loading factor of 10 mg/cm$^2$ onto aluminum foil. To ensure better lamination to aluminum, the slurry was heated to 80° C. (open-cap) while being stirred, just prior to doctor-blading. The composite cathode was dried in a vacuum oven at 80° C. overnight to remove the residual THF and moisture.

The composite cathode was then transported into an argon-filled glovebox, where it was punched into small discs (area=1.4 cm$^2$) using a high-precision electrode cutter EL-CUT (EL-CELL). Ionic liquid (EMImTFSI diluted with THF) was then drop-cast onto the disc, and the THF was allowed to evaporate.

To prepare the PIL electrolyte, ionic liquid (1-ethyl-3-methylimidazolium bis(trifluoroethylsulfonyl)imide or EMImTFSI), and low molecular weight PEG-DME were mixed at a 4:1 ratio by weight. A lithium salt (LiTFSI) was then added at 0.5 M concentration. The solution was referred to as the PIL electrolyte. The PIL solution was then mixed with the GCE solution and drop-cast onto the cathode disc, and the excess solvent was allowed to evaporate. The result was a gel on top of the cathode (i.e., the solid graft copolymer was plasticized with PIL). Similar experiments were carried out with 1-butyl-3-methylimidazolium bis(trifluoromethylsulfonyl)imide (BMImTFSI) and 1-butyl-1-methylpyrrolidinium bis(trifluoromethylsulfonyl)imide (BMPyTFSI).

To prepare a GCE-coated lithium metal anode, pure GCE solution (POEM-g-PDMS and LiTFSI, both dissolved in THF) was then drop-cast onto a metallic lithium disc (obtained from Sigma-Aldrich, 0.75 mm thick). The final cell was sealed in a CR2032 coin cell using a manual closing tool (Hohsen).

Figure 2:
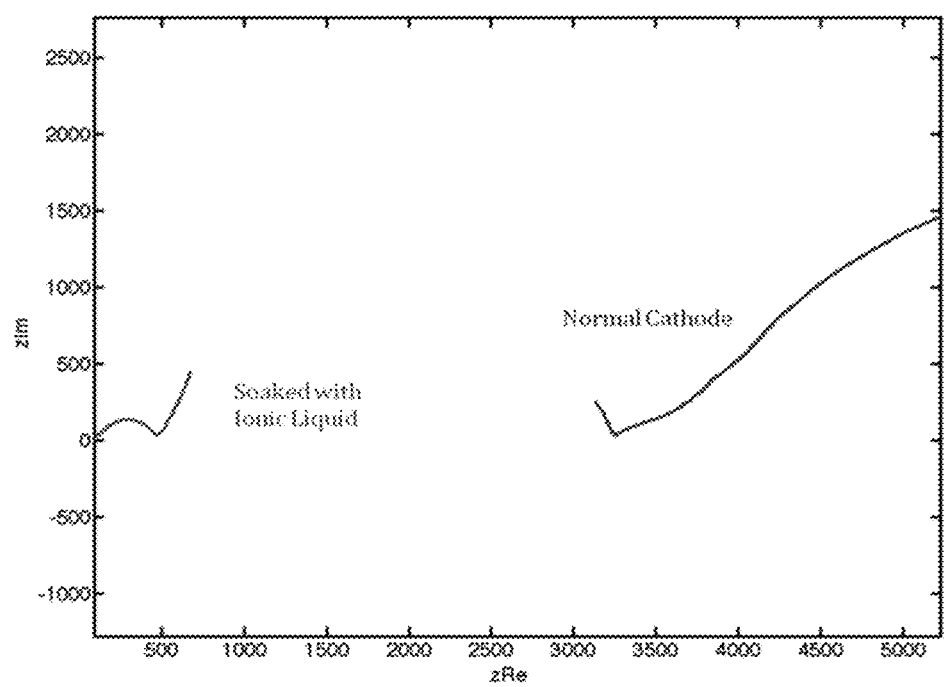
FIG. 2 is a plot of interfacial impedance, showing the influence of soaking a cathode in ionic liquid, in accordance with an illustrative embodiment of the invention.
Figure 3:
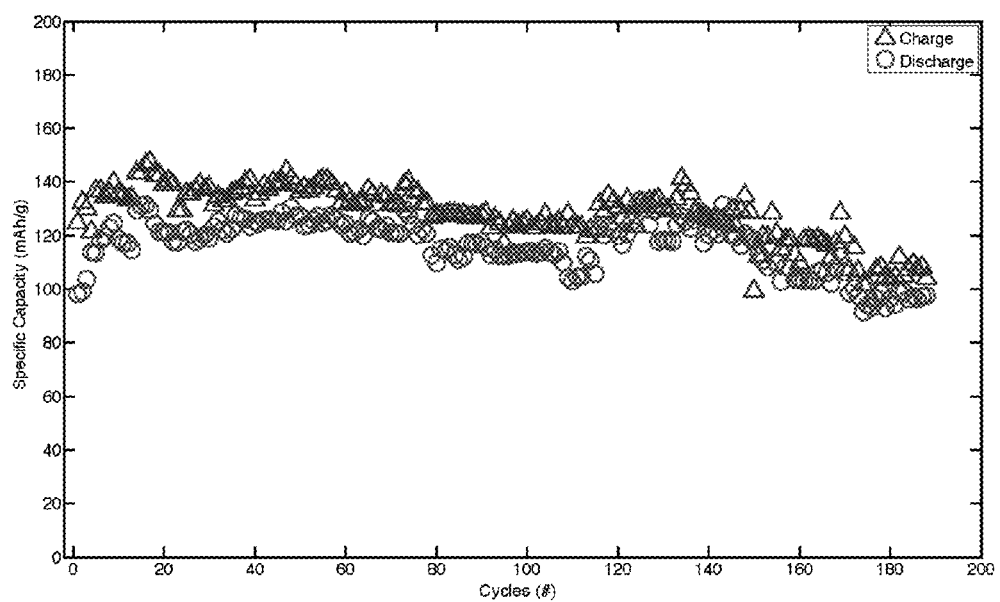
FIG. 3 is a plot of specific capacity for room temperature cycling at C/5, in accordance with an illustrative embodiment of the invention.
Figure 4:
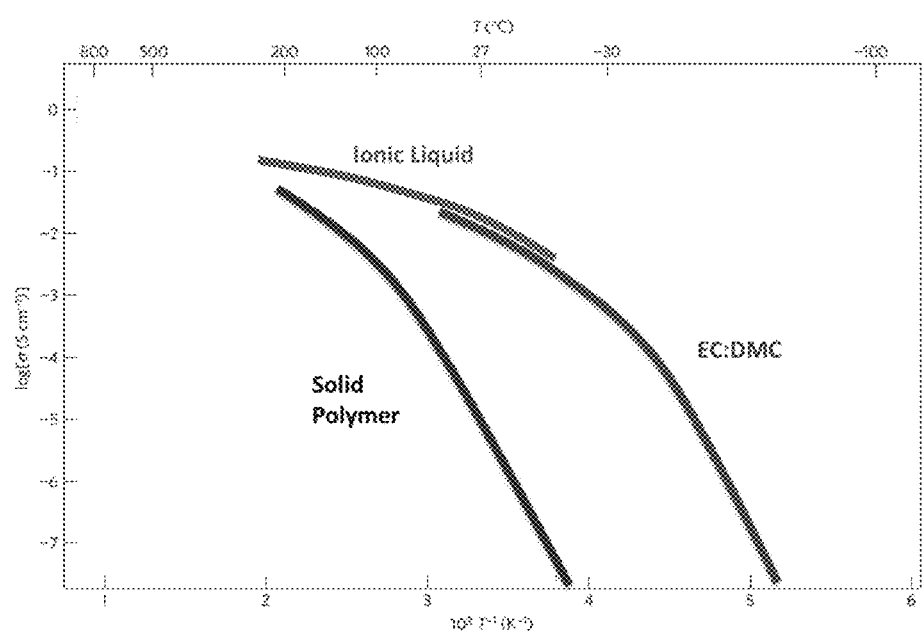
FIG. 4 is a plot of conductivity of various electrolytes at different temperatures, in accordance with an illustrative embodiment of the invention.

Performance results for the battery are presented in FIGS. 2 through 4. Referring to FIG. 2, by soaking the cathode with ionic liquid, the interfacial impedance was observed to decrease. To perform the impedance measurements, symmetric cells with two cathode discs were assembled, and electrochemical impedance spectroscopy was scanned. As depicted, the cells with cathodes that were soaked with ionic liquid showed much lower impedance than cells with normal, non-soaked cathodes.

Referring to FIG. 3, a full cell (LiFePO$_4$/PIL/GCE-coated Lithium metal) was cycled at room temperature at C/5 current. As indicated, nearly the full specific capacity was achieved at a relatively high current, which may not be possible with a pure solid polymer lithium cell.

Referring to FIG. 4, the conductivities of three different electrolytes were measured at temperatures from room temperature up to 250° C. The three electrolytes were: a conventional carbonate-based liquid electrolyte (EC:DMC); an ionic liquid (EMIm/TFSI); and the solid graft copolymer. As depicted, both the ionic liquid and solid polymer showed great stability at elevated temperatures.

Further experiments were performed to test batteries featuring ultra-thin Li metal anode coated or plated with a thin solid polymer electrolyte (SPE) layer and a porous cathode infiltrated with a PIL. These examples used the graft copolymer electrolyte (GCE) as the SPE, prepared as discussed above. In brief, to produce the graft copolymers (GCE), 26 mL of POEM (or POEA) monomers, 3.2 mL of PDMS macromonomers, and 12 mg of AIBN (monomer:initiator=825:1) were mixed in 160 mL of EA. To prepare the PIL electrolyte, an ionic liquid (1-ethyl-3-methylimidazolium bis(trifluoroethylsulfonyl)imide or EMImTFSI), and low molecular weight PEG-DME were mixed at a 4:1 ratio by weight.

Figure 6:
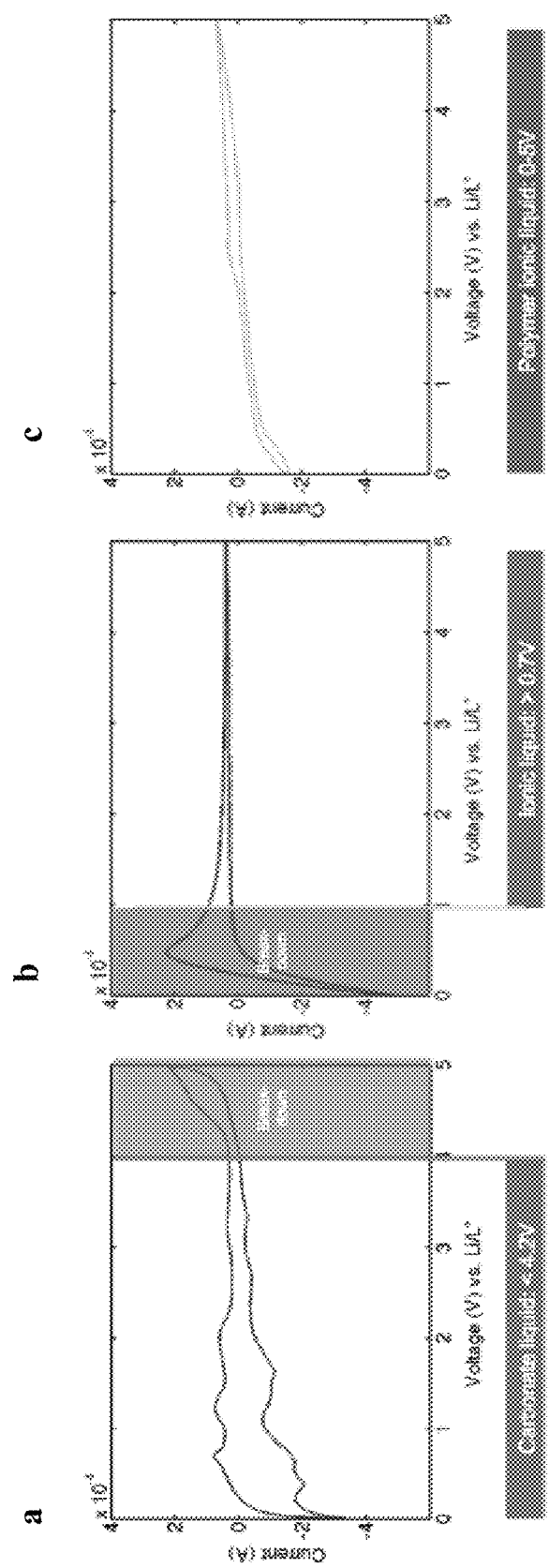
FIG. 6 includes plots demonstrating a wide electrochemical window of the batteries in accordance with an illustrative embodiment of the invention.

The liquid electrolyte used in various experimental examples described herein demonstrate wide electrochemical stability. Ionic liquids may be stable at high voltage cathode, and the solid electrolyte may be stable at low voltage anode. Combining them in series can result in a layered electrolyte that is stable at both high voltage cathode and low voltage anode. FIG. 6 shows that (a) conventional organic carbonate liquid electrolyte starts decomposing above 4.2V vs. Li/Li+, (b) pure ionic liquid starts decomposing below 0.8V vs. Li/Li+, but (c) PIL is stable from 0V to 5V.

Figure 7:
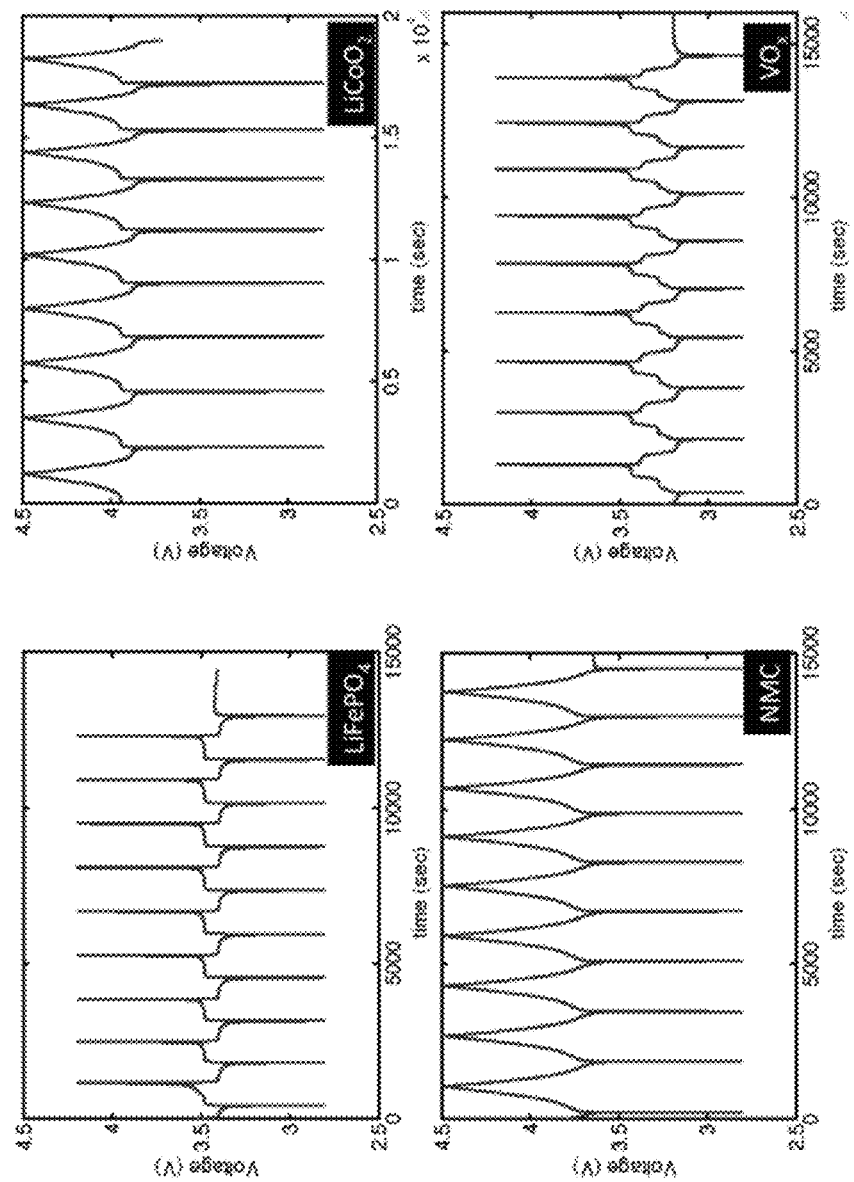
FIG. 7 includes plots of cycling of the batteries with four standard cathodes, in accordance with an illustrative embodiment of the invention.

Batteries having a structure (504) as depicted in FIG. 5 can be made with numerous kinds of cathodes. For example, FIG. 7 shows cycling data of four batteries with 4 standard cathodes, LiFePO$_4$, LiCoO$_2$, Li(Ni$_x$Mn$_y$Co$_z$)O$_2$ (NMC) (lithium nickel manganese cobalt oxide) and VOx, where each battery has both a liquid electrolyte and a solid electrolyte as depicted in FIG. 5 (504).

Figure 8:
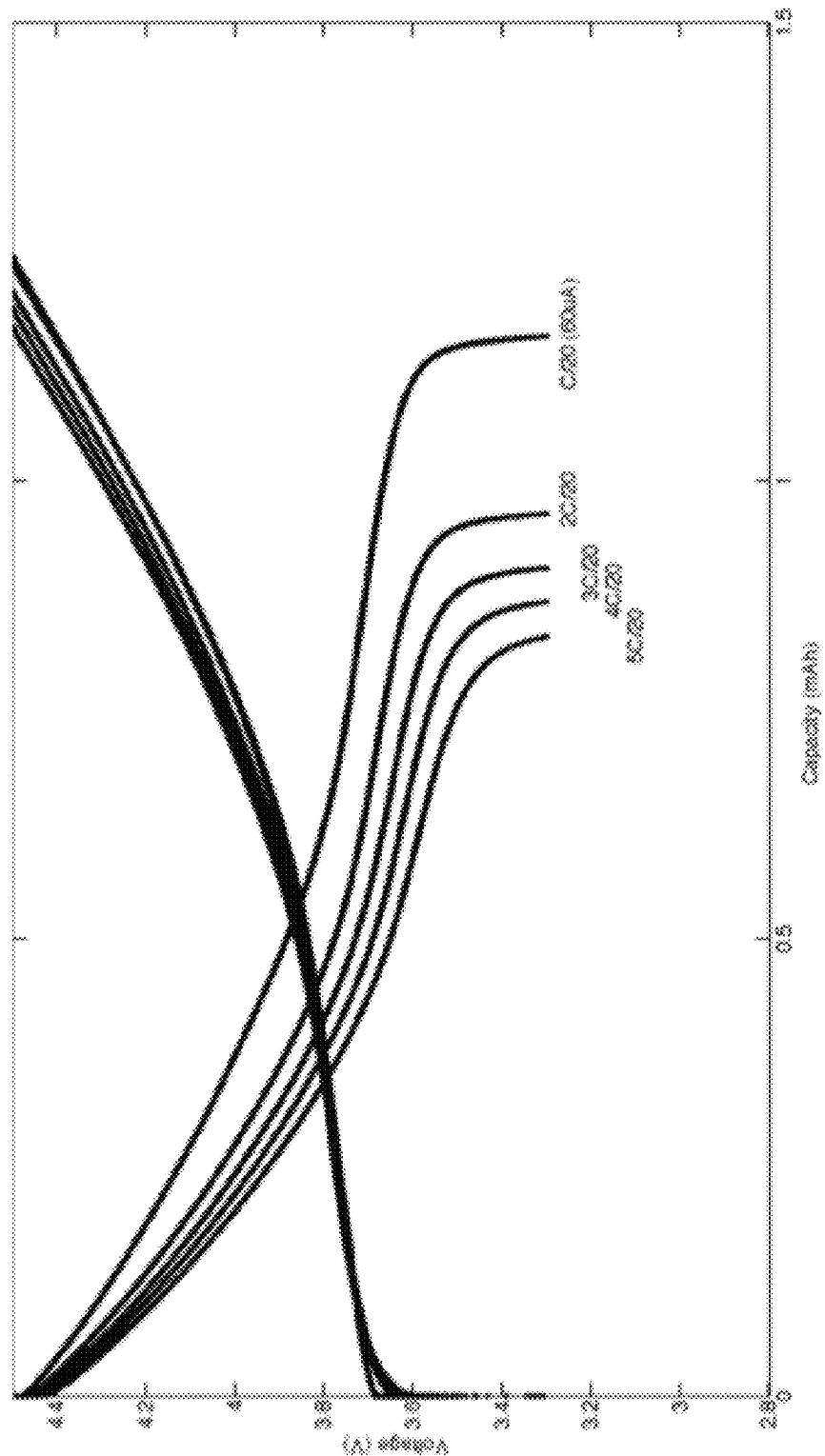
FIG. 8 is a plot of rate capability of the battery with a lithium nickel manganese cobalt oxide (NMC) cathode, in accordance with an illustrative embodiment of the invention.
Figure 9:
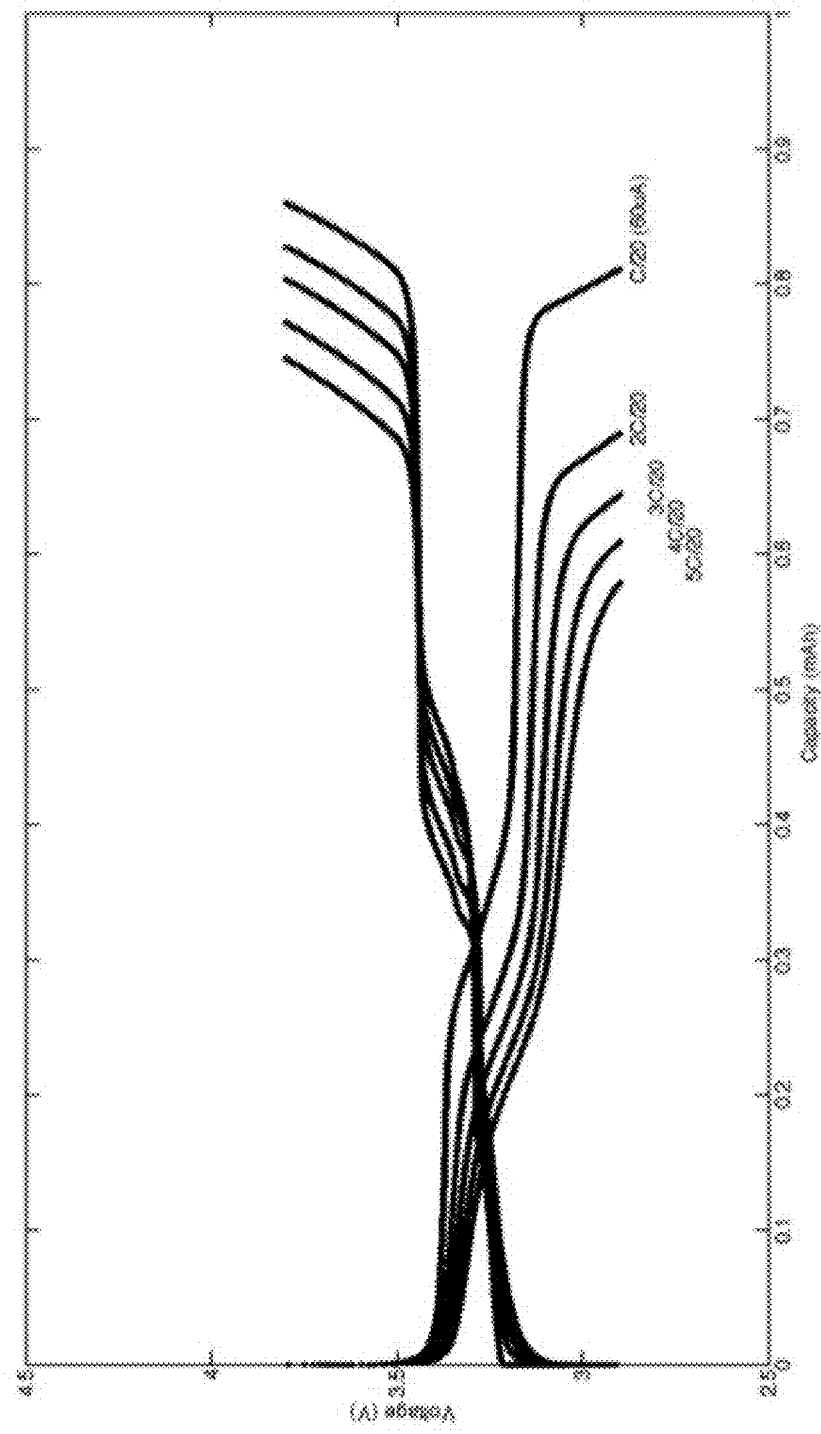
FIG. 9 is a plot of rate capability of the battery with a VOx cathode, in accordance with an illustrative embodiment of the invention.
Figure 10:
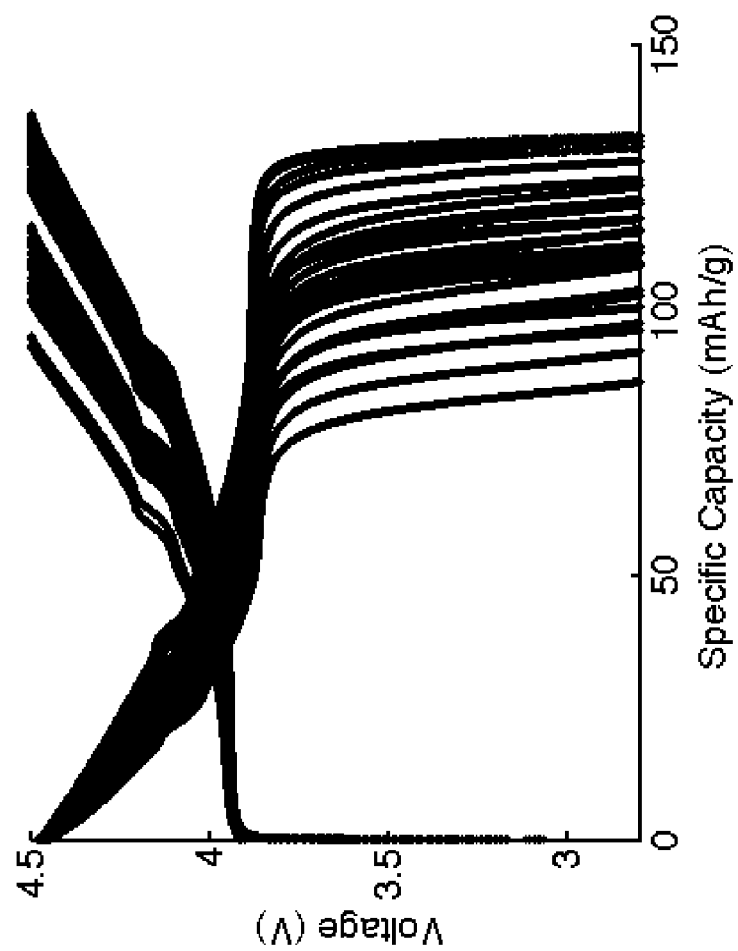
FIG. 10 is a plot of cycling voltage profile of the battery with a LiCoO2 cathode, in accordance with an illustrative embodiment of the invention.
Figure 11:
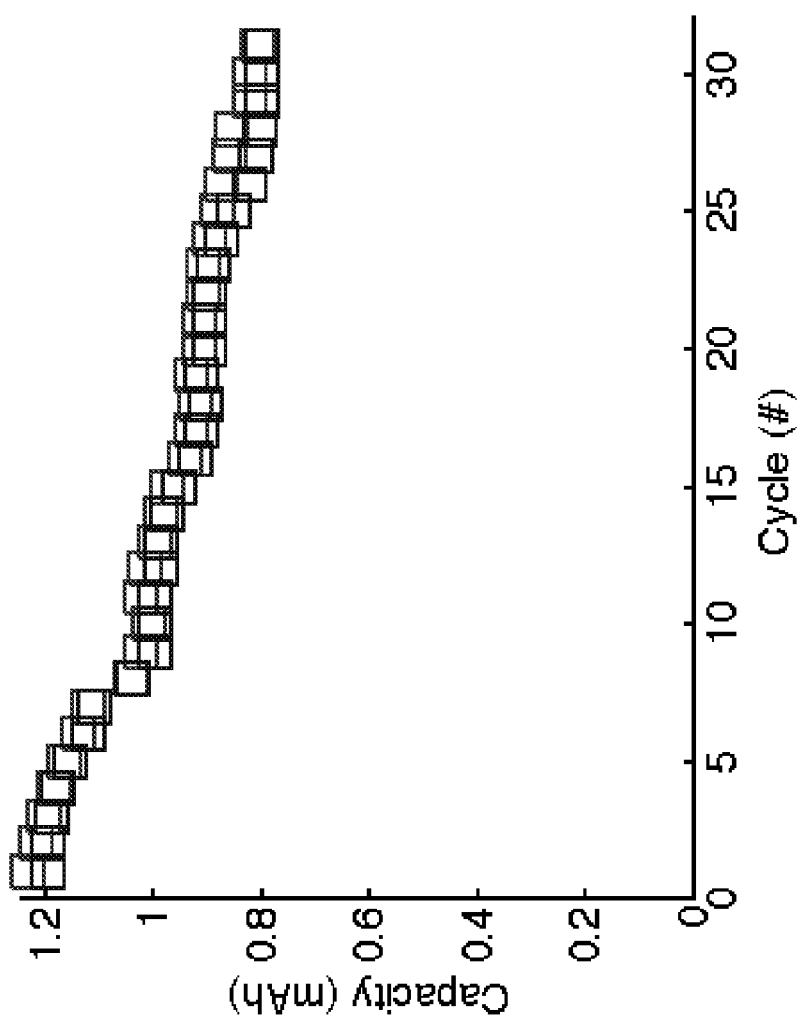
FIG. 11 is a plot of cycling capacity of the battery with a LiCoO2 cathode, in accordance with an illustrative embodiment of the invention.
Figure 12:
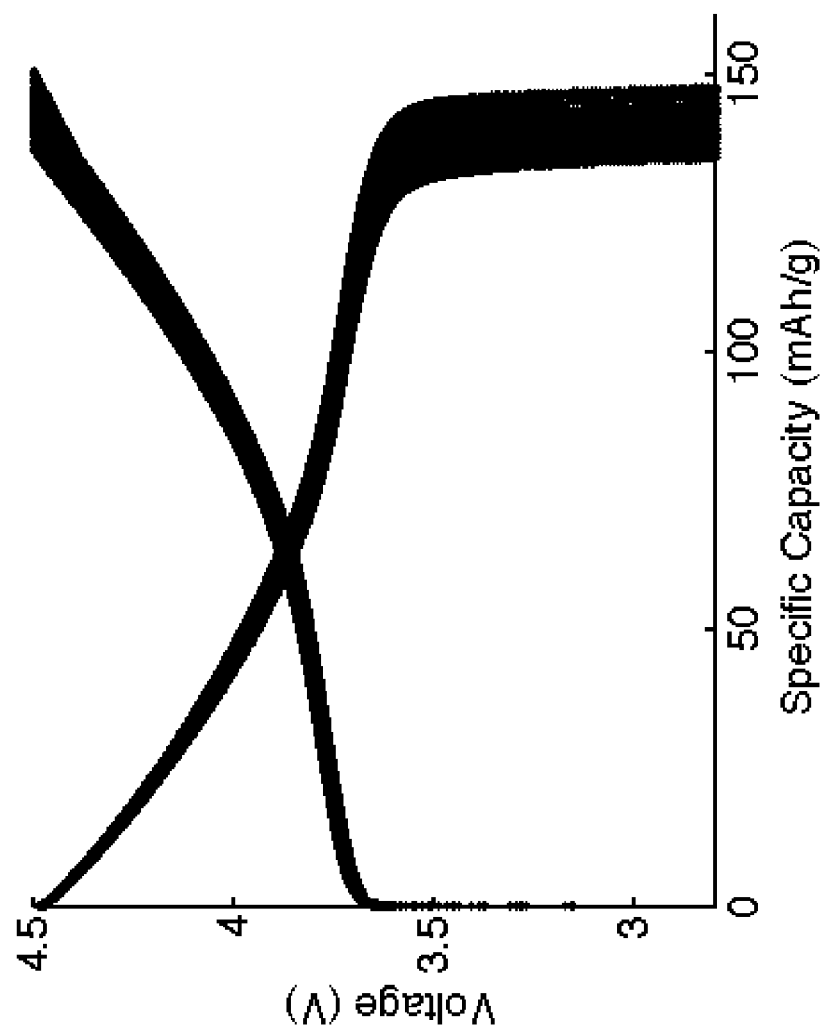
FIG. 12 is a plot of cycling voltage profile of the battery with a NMC cathode, in accordance with an illustrative embodiment of the invention.
Figure 13:
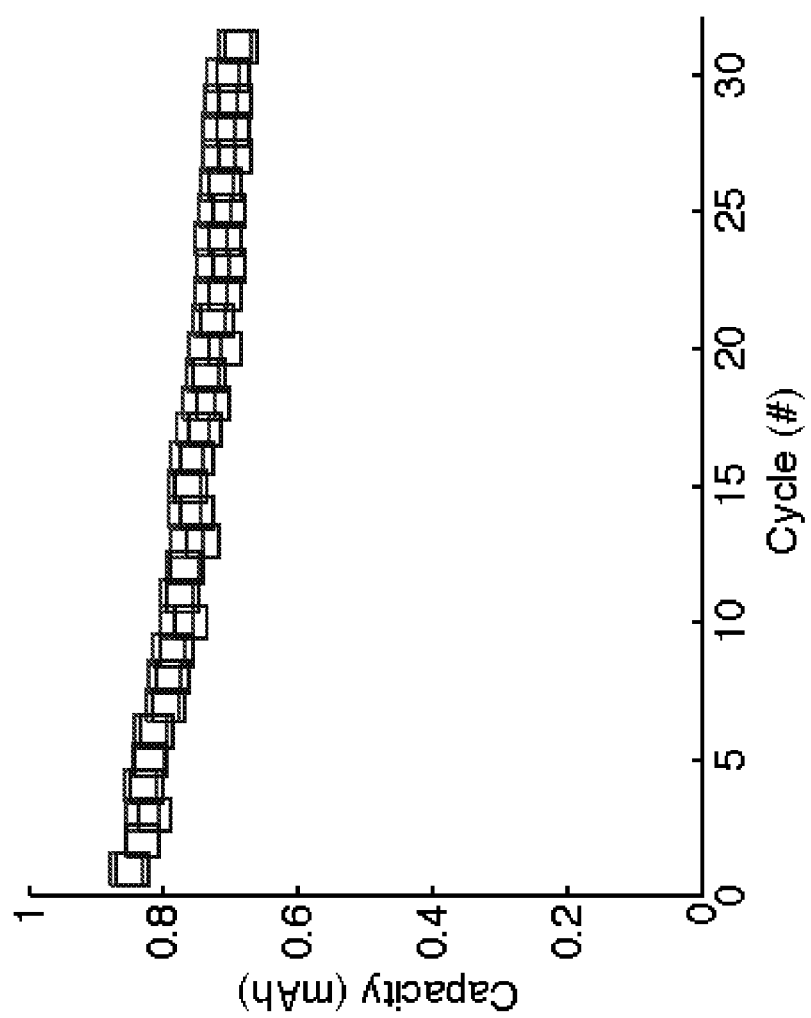
FIG. 13 is a plot of cycling capacity of the battery with a NMC cathode, in accordance with an illustrative embodiment of the invention.

The batteries can achieve decent rate capabilities, better than batteries with pure solid electrolyte. FIGS. 8 and 9 show rate capabilities of the batteries as depicted in FIG. 5 with NMC and VOx cathodes at room temperature. FIG. 10-13 show preliminary cycling data of the batteries as depicted in FIG. 5 with LiCoO$_2$ and NMC cathodes respectively. LiTFSI salts were used in both solid polymer electrolyte and ionic liquid. In certain embodiments, other salts and coated cathodes can be used to improve cycling capacity retention.

Figure 14:
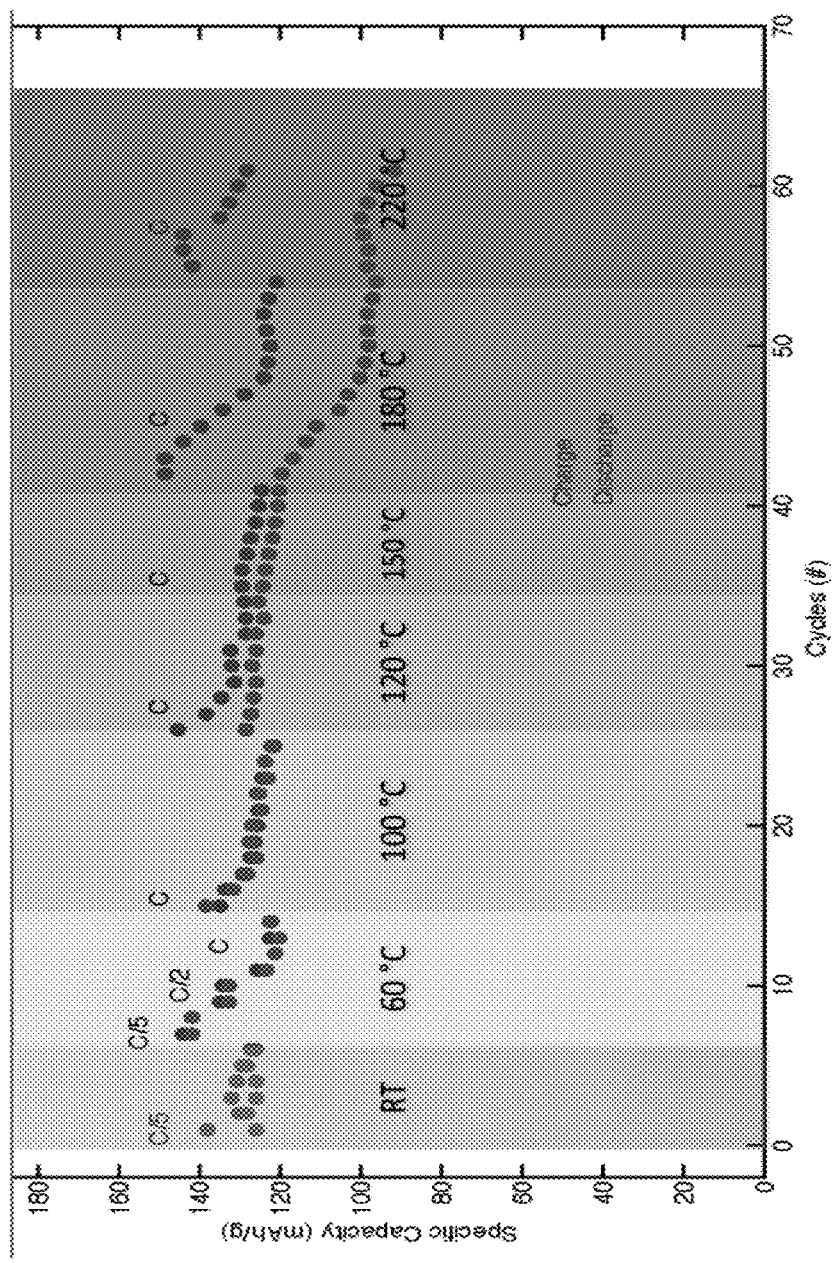
FIG. 14 is a plot of cycling of a coin cell with LiFePO4 cathode at various temperatures from room temperature to 200° C., in accordance with an illustrative embodiment of the invention.

FIG. 14 shows cycling of a coin cell with a structure shown in FIG. 5 with LiFePO$_4$ cathode and lithium metal anode at various temperatures from room temperature up to 220° C. (above the melting point of lithium metal). Even with a molten lithium metal anode, the solid polymer coating on lithium metal and ionic liquid electrolyte remain functional. Such high temperature capability enables, for example, downhole applications in oil & gas exploration.

Equivalents

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A rechargeable lithium battery comprising:
   (i) a composite cathode including a graft copolymer electrolyte binder and an ionic liquid;
   (ii) a liquid electrolyte comprising a polymer ionic liquid (PIL) and a lithium salt and a solid electrolyte comprising a solid graft copolymer including at least two low glass transition temperature ($T_g$) polymer blocks, wherein a first polymer block is hydrophobic and a second polymer block is hydrophilic; and
   (iii) an anode at least partially coated or plated with the solid electrolyte.

2. The battery of claim 1, wherein the cathode and the anode are positioned in relation to each other such that lithium ions travelling from one electrode to the other pass through the liquid electrolyte and the solid electrolyte in series.

3. The battery of claim 1, wherein the liquid electrolyte further comprises at least one member selected from the group consisting of an organic carbonate liquid and a gel electrolyte.

4. The battery of claim 1, wherein the solid electrolyte further comprises at least one member selected from the group consisting of a ceramic and a polymer-ceramic composite.

5. The battery of claim 1, wherein the hydrophobic block is polydimethyl siloxane (PDMS) and the hydrophilic block is polyoxyethylene methacrylate (POEM) and/or polyoxyethylene acrylate (POEA).

6. The battery of claim 1, wherein the solid electrolyte further comprises a lithium salt selected from the group consisting of LiTFSI, LiPF$_6$, LiBF$_4$, LiClO$_4$, LiCF$_3$SO$_3$, LiN(CF$_3$SO$_2$)$_2$, LiSbF$_6$, LiAsF$_6$, LiN(CF$_3$CF$_2$SO$_2$)$_2$, (C$_2$H$_5$)$_4$NBF$_4$, (C$_2$H$_5$)$_3$CH$_3$NBF$_4$, and LiI.

7. The battery of claim 1, wherein the cathode is porous and is infiltrated by the liquid electrolyte.

8. The battery of claim 1, wherein the liquid electrolyte comprises a low molecular weight polymer, a thermally stable ionic liquid, and the lithium salt.

9. The battery of claim 8, wherein the low molecular weight polymer comprises an ethylene oxide chain.

10. The battery of claim 8, wherein the thermally stable ionic liquid comprises an organic cation and an inorganic anion.

11. The battery of claim 1, wherein the liquid electrolyte comprises at least one member selected from the group consisting of LiPF$_6$, LiBF$_4$, LiClO$_4$, LiCF$_3$SO$_3$, LiN(CF$_3$SO$_2$)$_2$, LiSbF$_6$, LiAsF$_6$, LiN(CF$_3$CF$_2$SO$_2$)$_2$, (C$_2$H$_5$)$_4$NBF$_4$, (C$_2$H$_5$)$_3$CH$_3$NBF$_4$, and LiI.

12. The battery of claim 1, wherein the anode comprises lithium, sodium, calcium, magnesium, aluminum, lithium alloy, sodium alloy, calcium alloy, magnesium alloy, aluminum alloy, and/or a lithium-intercalant or metal-intercalant.

13. The battery of claim 1, wherein the at least two low glass transition temperature ($T_g$) polymer blocks have a $T_g$ less than about 0° C., less than about −25° C., or less than about −40° C.

14. The battery of claim 1, wherein the composite cathode comprises $LiFePO_4$, $LiCoO_2$, $Li(Ni_xMn_yCo_z)O_2$ (NMC), VOx, an intercalant material, carbon particles, a solid block copolymer binder, a thermally stable ionic liquid, or combinations thereof.

15. The battery of claim 1, wherein the binder comprises a solid graft copolymer electrolyte (GCE).

16. The battery of claim 1, wherein the ionic liquid comprises a thermally stable ionic liquid having an organic cation and an inorganic anion.

17. The battery of claim 1, further comprising a separator.

18. The battery of claim 1, wherein the battery is roll-to-roll printed.

19. The battery of claim 1, wherein the anode has an average thickness in a range from about 50 nm to about 100 um.

20. The battery of claim 1, wherein the battery has a form selected from the group consisting of a pouch, a prism, a cylinder, and a thin film.

21. The battery of claim 1, wherein a ratio of solid electrolyte to PIL is about 1:4 to about 1:1.

22. The battery of claim 1, wherein the solid electrolyte has a thickness of about 20 μm to about 50 μm.

23. The battery of claim 9, wherein the low molecular weight polymer is a glyme selected from the group consisting of poly(ethylene glycol) dimethyl ether, [polyglyme, PEGDME],tetra(ethylene glycol) dimethyl ether [tetraglyme, TEGDME], tri(ethylene glycol) dimethyl ether [triglyme], and combinations thereof.

24. The battery of claim 8, wherein the low molecular weight polymer has a weight-average molecular weight of about 75 to about 2000.

* * * * *